United States Patent
Choi et al.

(10) Patent No.: US 8,903,459 B2
(45) Date of Patent: Dec. 2, 2014

(54) CONNECTING TERMINAL FOR A BATTERY OF A MOBILE TERMINAL

(75) Inventors: Seongwoo Choi, Gyeonggi-Do (KR); Sanggil Park, Chungcheongnam-Do (KR); Youngkyu Kim, Incheon (KR); Youngchul Son, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 296 days.

(21) Appl. No.: 13/251,559

(22) Filed: Oct. 3, 2011

(65) Prior Publication Data
US 2012/0231855 A1    Sep. 13, 2012

(30) Foreign Application Priority Data

Mar. 7, 2011 (KR) .......................... 10-2011-0020110

(51) Int. Cl.
| H04B 1/38 | (2006.01) |
| H04M 1/00 | (2006.01) |
| H04M 1/02 | (2006.01) |

(52) U.S. Cl.
CPC .......... *H04M 1/0237* (2013.01); *H04M 1/0262* (2013.01); *H04M 1/0277* (2013.01)
USPC ...... 455/572; 455/573; 455/575.1; 455/575.4

(58) Field of Classification Search
CPC ........... H01R 13/2457; H01R 13/7033; H01R 2201/16; H01M 2/1022; H04M 1/0262; Y02E 60/12; H04W 52/00; H04W 52/0277
USPC .............................. 455/572, 573, 575.1, 575.4
See application file for complete search history.

(56) References Cited

U.S. PATENT DOCUMENTS

| 6,113,440 | A * | 9/2000 | Fijten et al. ................... 439/862 |
| 6,315,621 | B1 * | 11/2001 | Natori et al. .................. 439/862 |
| 6,863,540 | B2 * | 3/2005 | Spykerman ..................... 439/66 |
| 7,381,086 | B1 * | 6/2008 | Gilmore et al. ............... 439/500 |
| 7,387,541 | B1 * | 6/2008 | Lai et al. ....................... 439/660 |
| 7,575,469 | B1 * | 8/2009 | Hung ............................. 439/500 |
| 7,731,509 | B1 * | 6/2010 | Zhang ............................. 439/81 |
| 7,806,739 | B2 * | 10/2010 | Hu et al. ........................ 439/862 |
| 7,871,290 | B2 * | 1/2011 | Lou ............................... 439/500 |
| 8,079,875 | B2 * | 12/2011 | Ho ................................. 439/627 |
| 8,119,272 | B2 * | 2/2012 | Chen ............................. 429/100 |
| 8,267,725 | B2 * | 9/2012 | Zhu ................................ 439/660 |
| 2008/0153347 | A1 * | 6/2008 | Lai et al. ....................... 439/500 |
| 2009/0023331 | A1 * | 1/2009 | Chien et al. .................... 439/500 |

* cited by examiner

*Primary Examiner* — Liton Miah
(74) *Attorney, Agent, or Firm* — Birch, Stewart, Kolasch & Birch, LLP

(57) ABSTRACT

A mobile terminal including a main body having an accommodating chamber; a circuit board mounted at the main body; and connecting terminals disposed on the circuit board to be electrically connected to a battery having terminals. Further, when the battery is mounted in the accommodation chamber, the connecting terminals are pressed by the battery terminals to be elastically deformed. In addition, each of the connecting terminals includes a base portion electrically connected to the circuit board; an elastic portion having a first section extending from the base portion and a second section curved from the first section to have an inclination; and first and second contact portions extending from the second section to be contactable with the battery terminals.

20 Claims, 8 Drawing Sheets

CONNECTING TERMINAL FOR A BATTERY OF A MOBILE TERMINAL

CROSS-REFERENCE TO RELATED APPLICATION

This application claims the benefit of Korean Patent Application No. 10-2011-0020110, filed on Mar. 7, 2011, which is hereby incorporated by reference as if fully set forth herein.

BACKGROUND OF THE INVENTION

1. Field of the Invention

The invention relates to a mobile terminal having a connecting terminal electrically connected to a battery for power supply.

2. Background of the Invention

Mobile terminals are electronic devices which are portable and have at least one of voice and telephone call functions, information input and/or output functions, a data storage function and the like. Mobile terminals can also be used to capture still images or moving images, play music or video files, play games, receive broadcast and the like, so as to be implemented as a multimedia player.

Hardware and software have been developed in order to implement such complicated functions. As one example, user interface environments allowing a user to easily and conveniently search or select functions are provided.

Improvements of structural components for more convenient use of mobile terminals are constantly being developed. However, the power supply is still a problem in mobile terminals.

SUMMARY OF THE INVENTION

Therefore, an object of the invention is to enhance reliability of power supply to a terminal main body.

Another object of the invention is to provide a mobile terminal having a more enhanced electric connection between a battery and a circuit board.

To achieve these and other advantages and in accordance with the purpose of the invention, as embodied and broadly described herein, the present invention provides in one aspect a mobile terminal including a main body having an accommodating chamber; a circuit board mounted at the main body; and connecting terminals disposed on the circuit board to be electrically connected to a battery having terminals. Further, when the battery is mounted in the accommodation chamber, the connecting terminals are pressed by the battery terminals to be elastically deformed. In addition, each of the connecting terminals includes a base portion electrically connected to the circuit board; an elastic portion having a first section extending from the base portion and a second section curved from the first section to have an inclination; and first and second contact portions extending from the second section to be contactable with the battery terminals.

In another aspect, the present invention provides a mobile terminal including a main body configured to accommodate a battery having terminals; a circuit board mounted at the main body; and connecting terminals mounted on the circuit board to be electrically connected to the battery. Further, each of the connecting terminals includes a base portion electrically connected to the circuit board; and a plurality of contact portions extending from the base portion. In addition, the contact portions are elastically deformed, independent of each other, so that at least one contact portion contacts a battery terminal of the battery.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
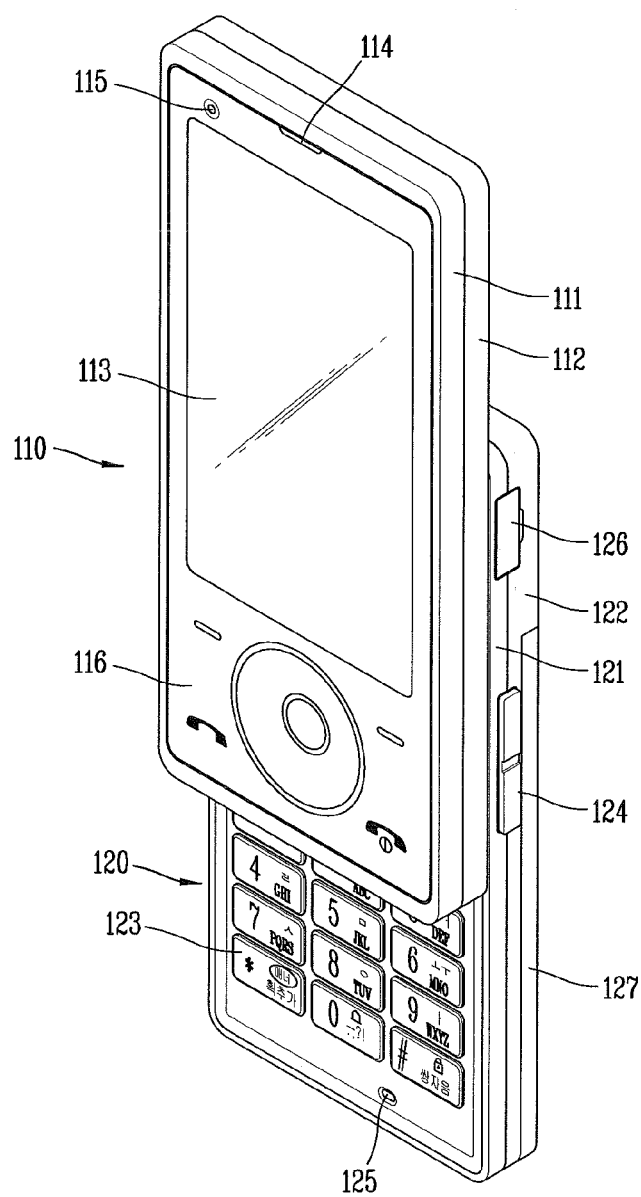
FIG. 1 is a perspective view of a mobile terminal in accordance with a first embodiment of the invention.

Description will now be given in detail of a connecting terminal unit and a mobile terminal having the same according to the exemplary embodiments, with reference to the accompanying drawings. This specification employs like/similar reference numerals for like/similar components irrespective of different embodiments, so they all will be understood by the first description. The expression in the singular form in this specification will cover the expression in the plural form unless otherwise indicated obviously from the context.

Figure 2:
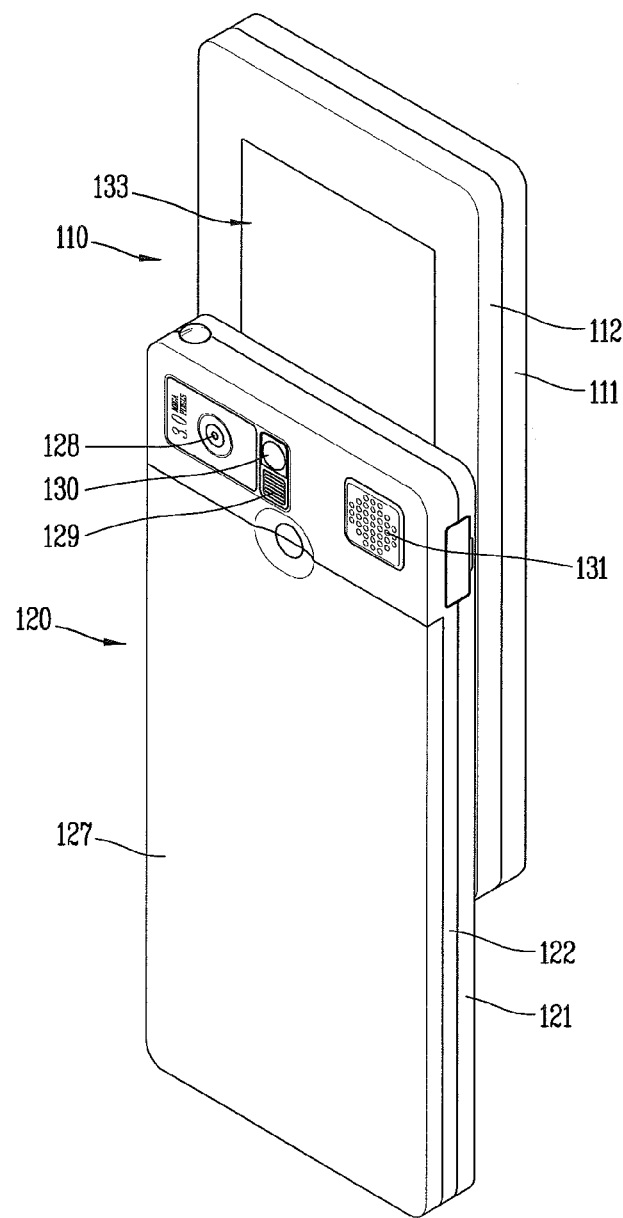
FIG. 2 is a rear perspective view of the mobile terminal shown in FIG. 1.

FIG. 1 is a front perspective view of a mobile terminal 100 in accordance with the first embodiment, and FIG. 2 is a rear perspective view of the mobile terminal. In FIG. 1, a main body (hereinafter, referred to as 'body') of the mobile terminal 100 includes a first body 110 and a second body 120 slidable in at least one direction with respect to the first body 110. Here, the type of the mobile terminal 100 is not limited to the slide type disclosed in this specification but applicable to various structures of mobile terminals such as a bar type, a folder type, a swing type, a swivel type and the like.

When the first body 110 is in an overlapped state with the second body 120, the mobile terminal 100 is in a closed configuration. As shown in FIGS. 1 and 2, when the first body 110 partially exposes the second body 120, the mobile terminal 100 is in an opened configuration.

The mobile terminal 100 can operate in a standby mode in the closed configuration but the standby mode can be released according to a user's manipulation. Also, the mobile terminal 100 can operate in a call-communication mode in the opened configuration but this mode can be converted into the standby mode according to the user's manipulation or after a certain time duration.

As shown in FIG. 1, the case (casing, housing, cover, etc.) forming an outer appearance of the first body 110 includes a front case 111 and a rear case 112. A space formed by the front case 111 and the rear case 112 can accommodate various components. At least one intermediate case may further be disposed between the front case 111 and the rear case 112. Such cases may be formed by injection-molded synthetic resin, or may be formed using a metallic material such as stainless steel (STS) or titanium (Ti).

The first body 110, in detail, the front case 111 is shown having a display unit 113, an audio output module 114, a first image input unit 115, a first manipulation unit 116, and the like. The display unit 113 may include a Liquid Crystal Display (LCD) module, an Organic Light-Emitting Diode (OLED) module, a Transparent OLED (TOLED) module and the like to display visible information. The display unit 113 may further include any suitable device, such as a touch pad to allow user's touch input. Also, the display unit 113 may be configured to generate various tactile effects, which the user can feel upon a touch input. A haptic module cooperatively working with the display unit 113 can be used to generate various tactile effects. A representative example of the tactile effects generated by the haptic module includes vibration. The haptic module may be disposed in any suitable manner according to the configuration of the mobile terminal as well as the display unit 113.

In addition, the audio output module 114 may include a receiver, a speaker, a receiver, or the like. The first image input unit 115 may be a camera module for capturing images or video of the user and the like, and the first manipulation unit 116 can be manipulated to allow input of commands for controlling operations of the mobile terminal 100, and manipulated as a touch screen together with the display unit 113.

Similar to the first body 110, the case of the second body 120 includes a front case 121 and a rear case 122. A second manipulation unit 123 is disposed at the second body 120, particularly, at a front face of the front case 121. At least one of the front case 121 or the rear case 122 may also be provided with a third manipulation unit 124, a first audio input unit 125, an interface unit 126 and the like.

Further, the first to third manipulation units 116, 123 and 124 may be referred to as a manipulating portion. Such manipulating portion can employ any tactile manner that a user can touch or tap for manipulation. For instance, the manipulating portion may be implemented as a dome switch, a touchpad or the like by which a user can input commands or information in a pushing or touching manner. Alternatively, the manipulating portion may be implemented as a wheel or a jog which rotates keys or a joystick.

From the functional perspective, the first manipulation unit 116 is configured to input commands such as START, END, SCROLL or the like, and the second manipulation unit 123 is configured to input numbers, letters (characters), symbols or the like. Also, the third manipulation unit 124 can be used as a hot key, which performs a specific function such as activating the first image input unit 115.

The first audio input unit 125 may also be implemented, for example, as a type of microphone for receiving voice or other sounds input by the user. In addition, the interface unit 126 serves as a path for allowing data exchange between the mobile terminal 100 and an external device. For example, the interface unit 126 may be at least one of wired/wireless earphone ports, ports for short-range communication (e.g., IrDA, Bluetooth, WLAN, etc.), power supply terminals for power supply to the mobile terminal and the like. The interface unit 126 may also be a card socket for coupling to external cards, such as a Subscriber Identity Module (SIM), a User Identity Module (UIM), a memory card for storage of information and the like.

Referring to FIG. 2, the rear face of the rear case 122 of the second body 120 is shown having a second image input unit 128. The second image input unit 128 faces a direction which is opposite to a direction faced by the first image input unit 115 (see FIG. 1), and may have different pixels from those of the first image input unit 115. For example, the first image input unit 115 may operate with relatively lower pixels (lower resolution). Thus, the first image input unit 115 may be useful when a user can capture his face and send it to another party during a video call or the like. On the other hand, the second image input unit 128 may operate with relatively higher pixels (higher resolution) such that it can be useful for a user to obtain higher quality pictures for later use.

A flash 129 and a mirror 130 are additionally disposed adjacent to the second image input unit 128. Further, the flash 129 operates in conjunction with the second image input unit 128 when taking a picture using the second image input unit 128. The mirror 130 cooperates with the second image input unit 128 to allow a user to photograph himself in a self-portrait mode.

In addition, a second audio output module 131 is disposed at the rear case 122 and can cooperate with the first audio output module 114 (see FIG. 1) to provide stereo output. Also, the audio output module 131 may be configured to operate as a speakerphone.

A part of a slide module 133 for slidably coupling the first body 110 to the second body 120 is disposed at the rear case 111 of the first body 110. Another part of the slide module 133 is disposed at the front case 121 of the second body 120, so as not to be exposed to the exterior as shown in FIG. 2.

The above description describes the second image input unit 128 or the like being disposed at the second body 120. However, the present invention is not limited to this configuration. It is also possible that one or more of those components, which have been described to be implemented on the rear case 122, such as the second image input unit 128, will be implemented on the first body 110, particularly, on the rear case 112. In this configuration, the component(s) disposed on the rear case 112 can be protected by the second body 120 in a closed state of the portable terminal. In addition, without the second image input unit 128, the first image input unit 115 can be implemented to be rotatable so as to rotate up to a direction which the second image input unit 128 faces.

A power supply unit 127 is also provided at the rear case 122 to supply power to at least one component of the mobile terminal 100. The power supply unit 127, for example, includes a rechargeable battery 127a for power supply. The battery 127a may be detachably coupled for charging or the like.

Figure 3:
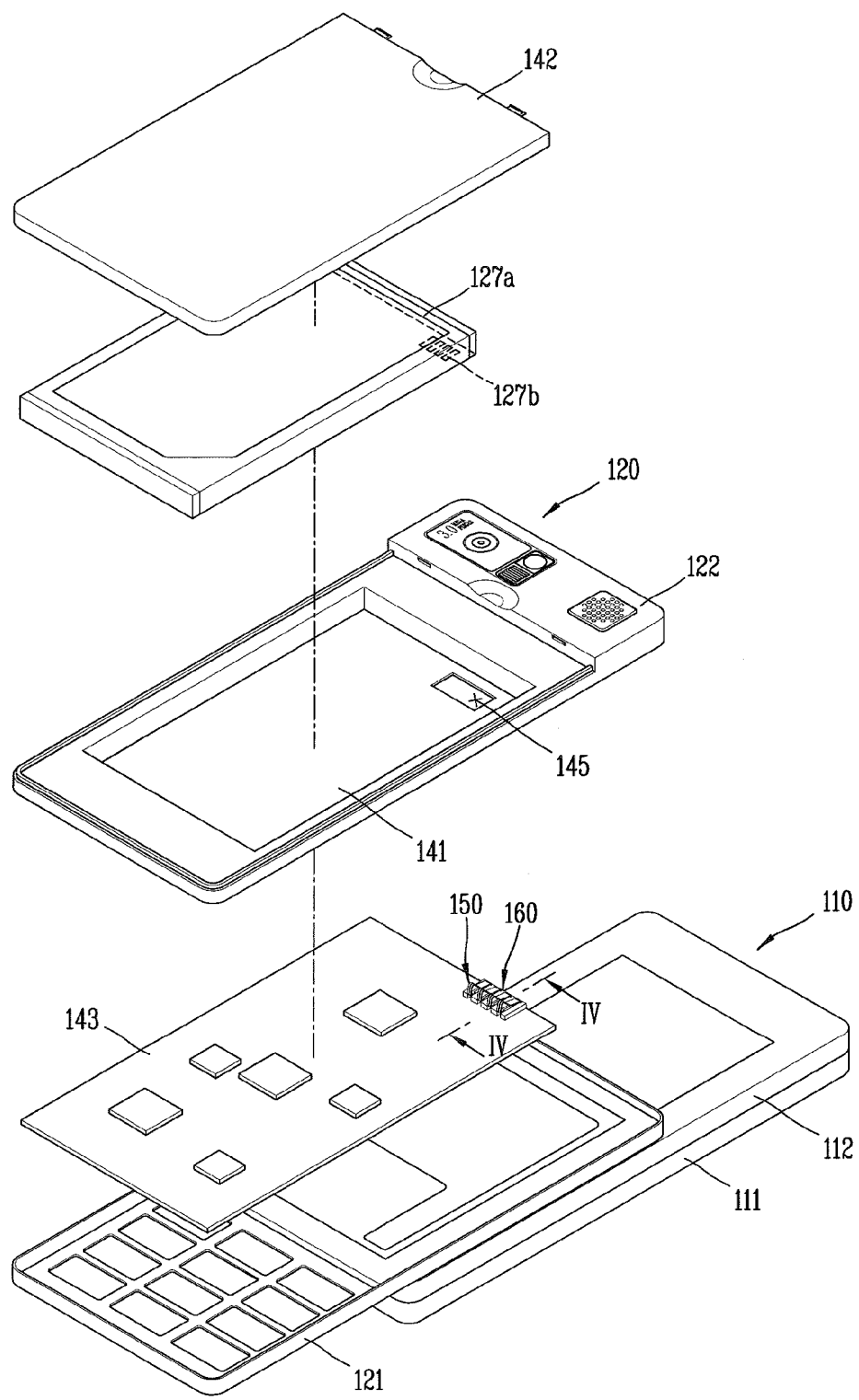
FIG. 3 is a disassembled view of a second body of FIG. 2.

Next, FIG. 3 is a disassembled view of the second body 120 of FIG. 1. As shown in FIG. 3, the rear case 122 includes an accommodation chamber 141 in a recessed form. The accommodation chamber 141 is recessed into one surface of the rear case 122 and has a size corresponding to an outer appearance of the battery 127a such that the battery 127a can be mounted therein. Further, a battery cover 142 is coupled to the rear case 122 to obscure the accommodation chamber 141 and the battery 127a.

In addition, a circuit board 143 is disposed within the terminal body and may be implemented as one example of a controller 190 for controlling functions of the mobile terminal 100. In more detail, the circuit board 143 can be located within the rear case 122 and mounted on the terminal body such that the battery 127a can be laminated on one surface of the circuit board 143.

Referring to FIG. 3, connecting terminals 150 are disposed on the circuit board 143 and a through hole 145 corresponding to the connecting terminals 150 is formed through a bottom of the accommodation chamber 141. A rear surface of the battery 127a is shown having battery terminals 127b corresponding to the connecting terminals 150.

In more detail, a connecting terminal unit 160 is mounted on the circuit board 143, and the connecting terminals 150 are disposed in the connecting terminal unit 160 to be electrically connected to the battery 127a. The connecting terminals 150 are pressed by the battery terminals 127b when the battery 127a is accommodated within the accommodating chamber 141, thereby being elastically transformed.

A shield can be mounted on the circuit board 143, 243 to shield electronic devices and define the bottom of the accommodating chamber 141. The connecting terminals 150 can also be located outside the shield.

Figure 4:
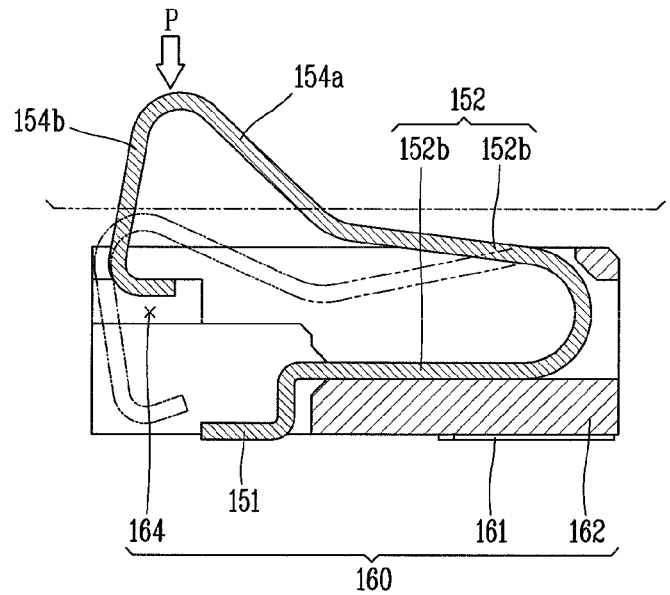
FIG. 4 is sectional view taken along the line IV-IV of FIG. 3, which shows a used state.
Figure 5:
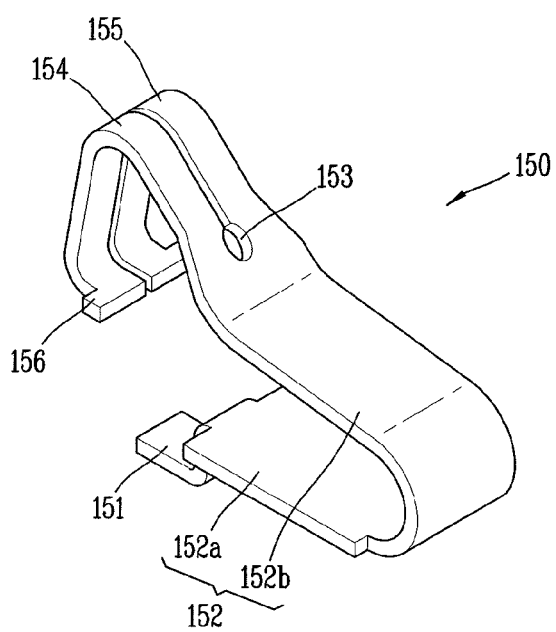
FIG. 5 is a perspective view of a connecting terminal in accordance with the first embodiment of the invention.
Figure 6:
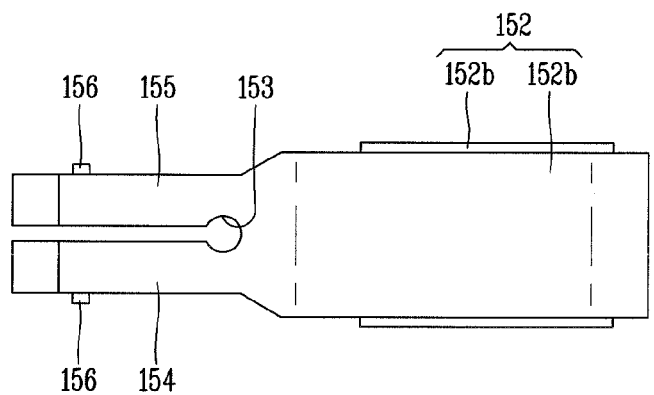
FIG. 6 is a planar view of the connecting terminal of FIG. 5.
Figure 7:
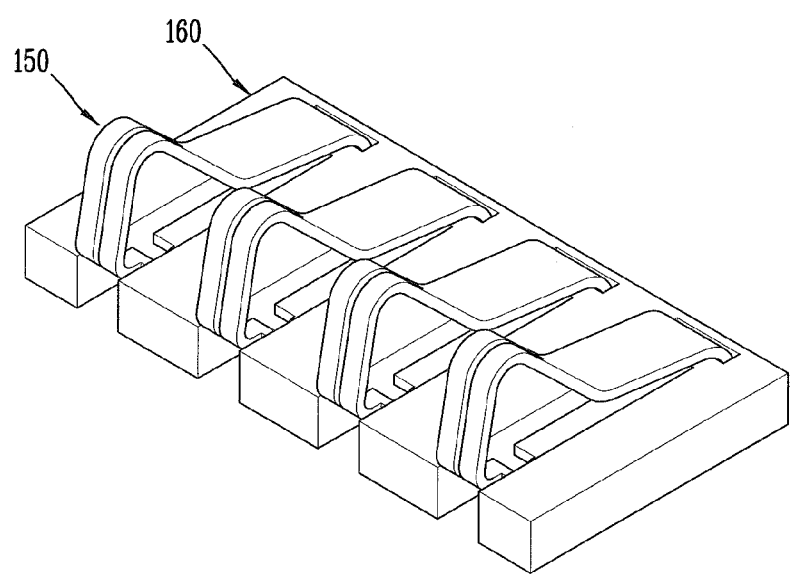
FIG. 7 is a perspective view of a connecting terminal unit in accordance with the first embodiment of the invention.

Next, FIG. 4 is sectional view taken along the line IV-IV of FIG. 3, which shows a used state, FIG. 5 is a perspective view of one connecting terminal 150 in accordance with the first embodiment, FIG. 6 is a planar view of the connecting terminal 150 of FIG. 5, and FIG. 7 is a perspective view of a connecting terminal unit in accordance with the first embodiment.

Referring to FIGS. 4 to 7, the connecting terminal unit 160 mounted on the circuit board 143 includes the connecting terminals 150, a supporting member 162, on which the connecting terminals 150 are disposed, and a mounted member 161 mounted on the circuit board 143 or the connecting terminal unit 160 can be mounted directly to the circuit board 143 without a mounted member 161.

Further, the connecting terminals 150 are elastically transformed when pressed by the battery terminals 127b to be maintained in an electrically connected state with the battery 127a upon use of the mobile terminal 100. More concretely, each connecting terminal 150 includes a base portion 151, an elastic portion 152 and contact portions 154 and 155. The base portion 151 contacts one surface of the circuit board 143 to be electrically connected thereto. Further, the elastic portion 152 may be made of a conductive metal, and include a first section 152a and a second section 152b. Here, the first section 152a extends from the base portion 151, and the second section 152b is bent from the first section 152a such that the connection terminal 150 can have elasticity.

Referring to FIGS. 5 and 6, the contact portions 154 and 155 are formed by being diverged from one end of the second section 152b into at least two parts. The contact portions 154 and 155 can be elastically transformed, independent of each other, using the connected base portion 151 to maintain an electric connection with the battery terminal 127b. Each of the contact portions 154 and 155 includes a first inclined section 154a curved from one end of the second section 152b toward the battery terminal 127b, and a second inclined section 154b curved from one end of the first inclined section 154a toward the circuit board 143.

A boundary P between the first inclined section 154a and the second inclined section 154b is rounded. Each connecting terminal 150 contacts the corresponding pressed battery terminal 127b near the round boundary so as to be electrically connected to each other. Hence, as each of the connecting terminals 150 includes the plurality of contact portions 154 and 155, at least one of the contact portions 154 and 155 can maintain the electric connection with the battery 127a even though an external impact is applied to the terminal. That is, the contact portions 154 and 155 maintain the contact with the battery terminal 127b, with being spaced apart from each other. Accordingly, when the battery 127a is affected by an external impact or the like, at least one contact portion can maintain the electric contact with the battery terminal 127b.

A hollow hole 153 is also formed at a portion where the divergence is started. Consequently, even when the contact portions 154 and 155 are independently elastically transformed, a crack is not generated at the second section 152b. To this end, as one example, an outer circumferential surface of the hollow hole 153 may be coated with a tempered member, or be made thicker.

Referring to FIGS. 5 and 6, each of the contact portions 154 and 155 further includes a guide protrusion 156 protruded from one end thereof in a lateral direction. In correspondence with the guide protrusions 156 of the contact portions 154 and 155, guide recesses 164, in which the guide protrusions 156 are slidable, are formed at each supporting member 162 of the connecting terminal unit 160. A corresponding guide recess 164 is recessed into one surface of the supporting member 162 adjacent to the guide protrusion 156 such that the guide protrusion 156 cannot be separated in a lateral direction or a vertical direction.

Accordingly, when the contact portions 154 and 155 are affected by an external impact or pressed by the battery 127a, the contact portions 154 and 155 are supported by the guide protrusions 156 within the guide recesses 164, whereby the contact portions 154 and 155 can avoid being separated in the lateral or vertical direction and allowed to maintain the electric connection with the battery 127a.

Each supporting member 162 for supporting the corresponding connecting terminal 150 may include a groove for receiving the connecting terminal 150. In this structure, in order to receive the plurality of connecting terminals 150, the connecting terminal unit 160, in which the connecting terminals 150 are located, may form a body extending in a lateral direction such that the connecting terminals 150 can be aligned in parallel in the lateral direction of the body. Further, the connecting terminals 150 are electrically connected to the battery terminals 127b corresponding to one of the anode, the cathode or the ground of the battery 127a, respectively.

Figure 8:
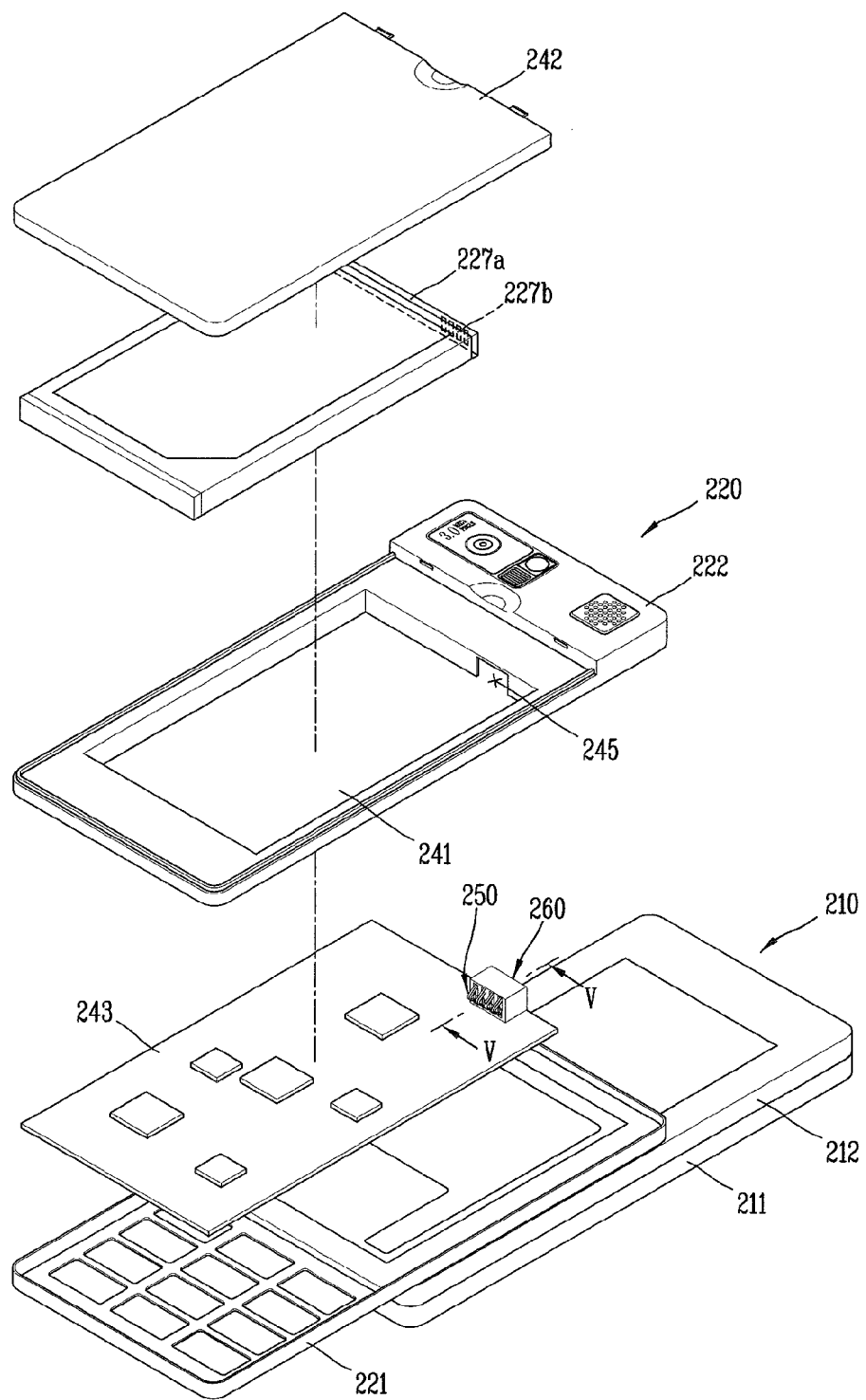
FIG. 8 is a disassembled view of a second body of a mobile terminal in accordance with a second embodiment of the invention.
Figure 9:
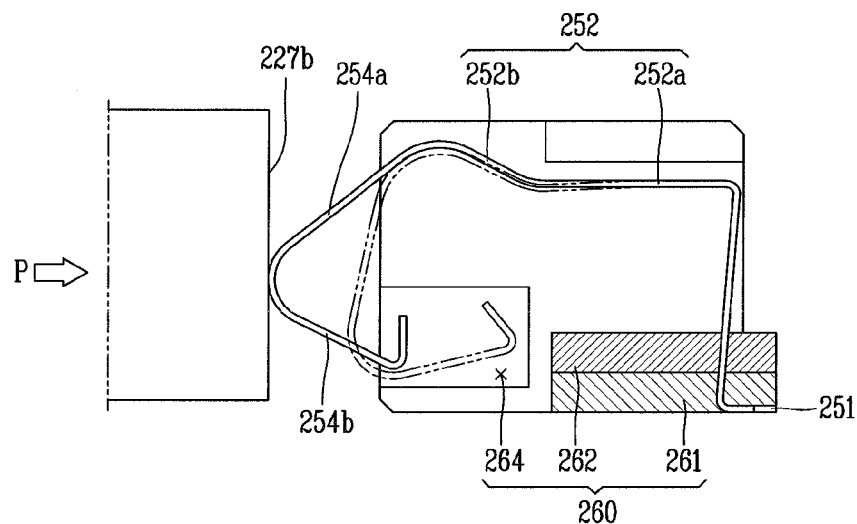
FIG. 9 is a sectional view taken along the line V-V of FIG. 8, which shows a used state.
Figure 10:
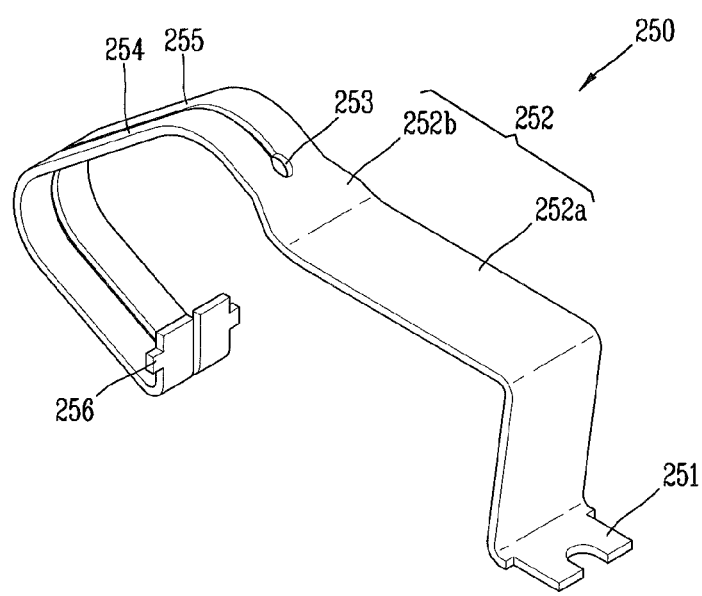
FIG. 10 is a perspective view of a connecting terminal in accordance with the second embodiment of the invention.
Figure 11:
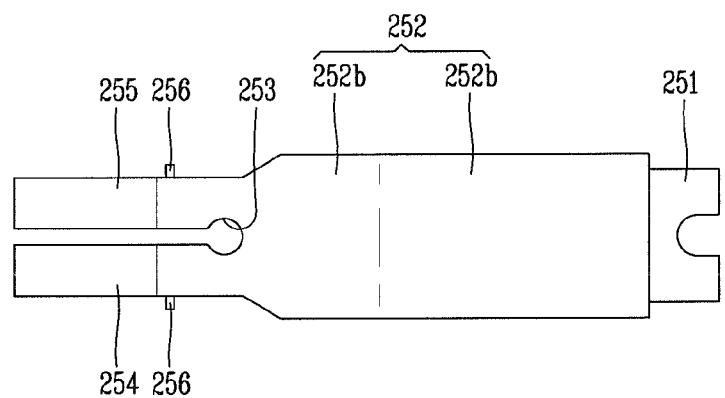
FIG. 11 is a planar view of the connecting terminal of FIG. 10.
Figure 12:
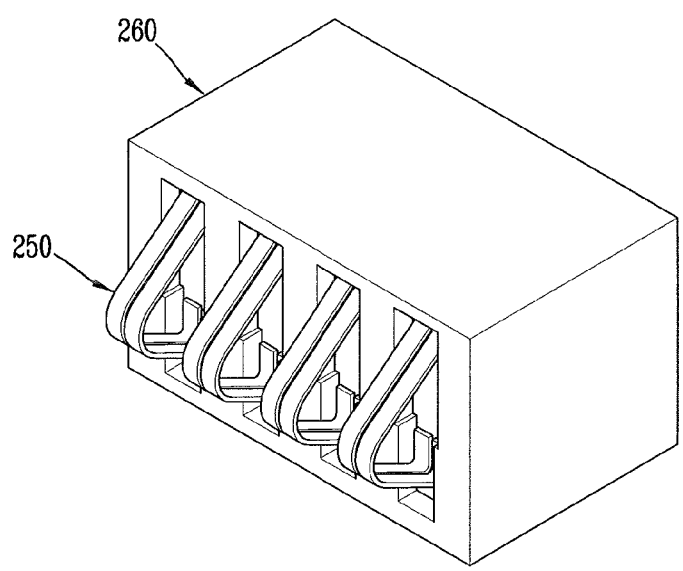
FIG. 12 is a perspective view of a connecting terminal unit in accordance with the second embodiment of the invention.

FIG. 8 is a disassembled view of a second body of a mobile terminal in accordance with a second embodiment, FIG. 9 is a sectional view taken along the line V-V of FIG. 8, which shows a used state, FIG. 10 is a perspective view of a connecting terminal according to the second embodiment, FIG. 11 is a planar view of the connecting terminal of FIG. 10, and FIG. 12 is a perspective view of a connecting terminal unit in accordance with the second embodiment.

The second embodiment of FIG. 8 has similar/like numerals for similar/like components to the first embodiment of FIG. 1. Thus, the configuration of the second embodiment can be understood by the description for the first embodiment. Also, the second embodiment of FIG. 8 is similar to the first embodiment excluding a connecting terminal unit 260 and related components.

In more detail, referring to FIGS. 8 and 9, a connecting terminal unit 260, in which connecting terminals 250 are located, are mounted on a circuit board 243, and include a supporting member 262, on which the connecting terminals 150 are disposed, and a mounted member 261 mounted on the circuit board 243 or the connecting terminal unit 260 can be mounted directly to the circuit board 243 without a mounted member 261. A through hole 245 corresponding to the connecting terminal unit 260 is also formed through a side surface of an accommodation chamber 241. Battery terminals 227a corresponding to the connecting terminals 250 are formed at a side surface (one end in a lengthwise direction) of the battery 227a.

Further, the connection terminal 250 includes a base portion 251, an elastic portion 252 and contact portions 254 and 255. The base portion 251 contacts one surface of the circuit board 243 to be electrically connected thereto. The base portion 251 also extends while being laminated on the supporting member 262 and then curves upwards to the elastic portion 252.

In addition, the elastic portion 252 may be made of a conductive metal, and include a first section 252a and a second section 252b. Hereinafter, the similar/like components to those in the embodiment described with reference to FIGS. 4 to 7 can be understood by the first description.

Unlike the first embodiment, the connecting terminals 250 are configured such that when pressed by the battery terminals 227b, one end of the second inclined section 254a is elastically transformed toward the base portion 251, thereby maintaining an electric connection with the battery 227a upon use of the terminal. With this structure, the connecting terminals 250 can maintain the electric contact with the battery terminals 227b even when an impact is applied in the lateral direction.

Thus, the present invention has several advantages. First, an electrical disconnection with the battery can be avoided even when connecting terminals are deformed due to an impact when the mobile terminal is dropped or the battery swells.

Also, as the connecting terminals and the connecting terminal unit are mounted on the circuit board, deformation and defect of a connected portion with the battery can be minimized even though a case, a battery cover or the like is changed in shape.

The constructions and methods of the forgoing exemplary embodiments for the connecting terminals and the mobile terminal having the same are merely exemplary and are not to be construed as limiting the present invention. Many alternatives, modifications, and variations can be implemented by selectively combining the aforementioned embodiment(s) entirely or partially. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a main body having an accommodating chamber;
   a circuit board mounted at the main body; and
   connecting terminals disposed on the circuit board to be electrically connected to a battery having terminals,
   wherein when the battery is mounted in the accommodation chamber, the connecting terminals are pressed by the battery terminals to be elastically deformed, and
   wherein each of the connecting terminals comprises:
      a base portion electrically connected to the circuit board;
      an elastic portion having a first section extending from the base portion and a second section curved from the first section to have an inclination; and
      first and second contact portions extending from the second section to be contactable with the battery terminals,
      wherein the first and second contact portions diverge from the second section, such that the first and second contact portions are elastically deformed independent of each other,
      wherein the first and second contact portions each have a first end and a second end, the first ends serving as fixed ends and the second ends spaced apart from each other by a preset interval,
      wherein a hollow hole is formed at a portion where divergence of the first and second contact portions starts such that a crack does not occur on the first ends, even though the first and second contact portions are independently elastically-deformed, and
      wherein the hollow hole has a circular shape and a diameter of the hollow hole is greater than a gap between the first and second contact portions.

2. The terminal of claim 1, wherein each of the first and second contact portions comprises a first inclined section curved from one end of the second section toward the battery terminal.

3. The terminal of claim 2, wherein each of the first and second contact portions further comprises a second inclined section curved from the first inclined section toward the circuit board.

4. The terminal of claim 1, further comprising:
   a connecting terminal unit mounted on the circuit board and having the connecting terminals therein,
   wherein the connecting terminal unit comprises:
      a mounted member allowing the connecting terminal unit to be mounted on the circuit board; and
      a plurality of supporting members configured to support the connecting terminals disposed thereon.

5. The terminal of claim 4, wherein the connecting terminal unit has a body extending in a lateral direction, and each of the supporting members comprises a groove for receiving one of the connecting terminals.

6. The terminal of claim 5, wherein the connecting terminals supported by the plurality of supporting members are electrically connected respectively to the battery terminals corresponding to one of an anode, a cathode and a ground of the battery.

7. The terminal of claim 4, wherein each of the first and second contact portions further comprises a guide protrusion protruded from one end in a lateral direction, and
   wherein the guide protrusion contacts the corresponding supporting member of the connecting terminal unit.

8. The terminal of claim 1, wherein the main body has a case,
   wherein the accommodation chamber is formed by recessing one section of the case of the mobile terminal,
   wherein a shield configured to shield electric devices is disposed on the circuit board and defines a bottom of the accommodation chamber, and wherein the connecting terminals are located outside the shield.

9. The terminal of claim 1, wherein the first and second contact portions are configured such that at least one contact portion maintains an electric connection with the battery terminal when the battery moves laterally.

10. A mobile terminal comprising:
a main body configured to accommodate a battery having terminals;
a circuit board mounted at the main body; and
connecting terminals mounted on the circuit board to be electrically connected to the battery,
wherein each of the connecting terminals comprises:
a base portion electrically connected to the circuit board; and
a plurality of contact portions extending from the base portion, the plurality of contact portions including first and second contact portions,
wherein the contact portions are elastically deformed, independent of each other, so that at least one contact portion contacts a battery terminal of the battery,
wherein the plurality of contact portions each have a first end and a second end, the first ends serving as fixed ends and the second ends spaced apart from each other by a preset interval,
wherein a hollow hole is formed at a portion where divergence of the first and second contact portions starts such that a crack does not occur on the first ends, even though the first and second contact portions are independently elastically-deformed, and
wherein the hollow hole has a circular shape and a diameter of the hollow hole is greater than a gap between the first and second contact portions.

11. The terminal of claim 10, wherein each of the connecting terminals comprises an elastic portion having a first section extending from the base portion and a second section curved from the first section to have an inclination.

12. The terminal of claim 11, wherein each of the contact portions comprises a first inclined section curved from one end of the second section toward the battery terminal.

13. The terminal of claim 12, wherein each of the contact portions further comprises a second inclined section curved from the first inclined section toward the circuit board.

14. The terminal of claim 10, further comprising:
a connecting terminal unit mounted on the circuit board and having the connecting terminals therein,
wherein the connecting terminal unit comprises:
a mounted member mounted on the circuit board; and
supporting members configured to support the connecting terminals disposed thereon.

15. The terminal of claim 14, wherein the connecting terminal unit has a body extending in a lateral direction, and each of the supporting members comprises a groove for receiving one of the connecting terminals.

16. The terminal of claim 15, wherein the connecting terminals disposed on the plurality of supporting members are electrically connected to battery terminals corresponding to one of an anode, a cathode and a ground of the battery.

17. The terminal of claim 14, wherein each of the first and second contact portions further comprises a guide protrusion protruded from one end thereof in a lateral direction, and
wherein the guide protrusion contacts the corresponding supporting member of the connecting terminal unit.

18. A connecting terminal unit comprising:
connecting terminals allowing an electric connection between battery terminals formed at one end of a battery and a circuit board; and
supporting members having the connecting terminals disposed thereon,
wherein each of the connecting terminals comprises:
a base portion electrically connected to the circuit board;
an elastic portion having a first section extending from the base portion and a second section curved from the first section to have an inclination; and
first and second contact portions extending from the second section to contact the battery terminals,
wherein the first and second contact portions diverge from the second section, such that the first and second contact portions are elastically deformed independent of each other,
wherein the first and second contact portions each have a first end and a second end, the first ends serving as fixed ends and the second ends spaced apart from each other by a preset interval,
wherein a hollow hole is formed at a portion where divergence of the first and second contact portions starts such that a crack does not occur on the first ends, even though the first and second contact portions are independently elastically-deformed, and
wherein the hollow hole has a circular shape and a diameter of the hollow hole is greater than a gap between the first and second contact portions.

19. The connecting terminal unit of claim 18, further comprising:
a mounted member configured to allow the connecting terminal unit to be mounted on the circuit board.

20. The connecting terminal unit of claim 18, wherein each of the first and second contact portions comprises a first inclined section curved from one end of the second section toward the battery terminal, and
wherein each of the first and second contact portions further comprises a second inclined section curved from the first inclined section toward the circuit.

* * * * *